United States Patent [19]
Haddock

[11] 3,747,256
[45] July 24, 1973

[54] FISHING LURE
[76] Inventor: William A. Haddock, 1040 Palms Blvd., Venice, Calif. 90291
[22] Filed: Nov. 3, 1971
[21] Appl. No.: 195,148

[52] U.S. Cl. ............................................. 43/42.13
[51] Int. Cl. ............................................. A01k 85/00
[58] Field of Search ...................... 43/42.13, 42.14, 43/42.49

[56] References Cited
UNITED STATES PATENTS
| 1,002,981 | 9/1911 | Ford | 43/42.49 |
| 3,253,363 | 5/1966 | Steehn | 43/42.13 |
| 3,257,750 | 6/1966 | Shannon | 43/42.13 |

Primary Examiner—Louis G. Mancene
Attorney—Robert E. Geauque

[57] ABSTRACT

Herein described is a combination fishing lure with a novel connector assembly therefor. The fishing lure includes a hook, a weighted head connected to the shank of the hook and an eyelet coupled to the weighted head at a position towards the hook so that a relatively equal weight distribution exists between the hook and the head. The connector assembly has a link with an eye on either end thereof defining a shaft therebetween and the eyes being on relatively the same plane. An elongated member is inserted through one of the eyes around the shank of the link and back through the same eye to define a pair of V-shaped extending arms. Each arm has an eye on the end thereof and connects the eye to a suitable spinner.

3 Claims, 3 Drawing Figures

PATENTED JUL 24 1973

3,747,256

FISHING LURE

BACKGROUND OF THE INVENTION

1. Field of the Invention

This invention relates to a combination fishing line and connector therefor and more particularly to a connector assembly useful, for example, in connecting a pair of spinners to a fishing lure and to a fishing line and the like.

2. Discussion of the Prior Art

Heretofore in the sport of fishing for bass in particular, it has been found particularly more exciting and sportsmanlike to fish with an artificial bait referred to as plugs or lures. These lures have been in many forms and in particular of late in the form of a hook, a weighted head and a skirt having a plurality of extending strips which are known to move about the water. The plugs are attached to the end of a fishing line and the line is cast into the water and certain movements in retrieving the lure through the water assimilates a desirable bait for the fish, and particularly bass.

It is desirable that the lure is pulled through the water with the hook extending from the rear thereof so that as a fish approaches the lure, it becomes hooked in the mouth of the fish when attacking the lure. It is necessary to provide a lure that attracts the fish probably in a number of different ways. One, of course, would be by making the lure visually attractive to the fish. This is done by metal spinners or blades attached to the lure that will rotate as the lure is pulled through the water and causing a flashing in the water. Recently it has been discovered that the fish are also susceptible to ultrasonic or sonic vibrations in the water. Thus the spinners have been extended from the lure by relatively thin members such as a spring steel wire so that it sets up a vibration of different sounds. These sound vibrations attract the fish again causing them to attack the lure, and the hook then becoming engaged in the mouth of the fish.

To excite a certain fish at certain times, it is found that the vibration sounds, the color of the lure, the flashing size of the blades all are taken into consideration. Therefore, the fisherman must constantly be searching for the right lure and combination of the above considerations to be used.

SUMMARY OF THE INVENTION

The present invention overcomes all the disadvantages set forth in the prior art devices and provides one which accomplishes all of the aforesaid desired features. Briefly described, the present invention includes a fishing lure which includes a hook which extends outwardly from a weighted head. A connector eye is connected to the weighted head. A skirt in the form of a plurality of extending strands is placed on the head and extends down towards the hook and substantially covers the hook from sight. To facilitate the fact that the hook is extending upwardly, that is, extending towards the top of the water when the lure is submerged in the water, the connector eye, to which the fishing line is ultimately coupled, is placed on the top of the lure on the same side in which the hook extends upwardly. The connector eye is connected to the weighted head at a position towards the hook so that a relatively equal weight distribution exists between the hook and the head so that a pendulum effect takes place with the connector at the eye so that lead head swings freely and will not bind.

A novel and unique connector assembly is provided and coupled to the connector eye in a manner so that it swivels thereon and has a pair of outwardly extending arms from the connector. An eyelet is formed on the end of each extending arm to which the blades or spinners are connected. The extending arms are preferably made of a single elongated member of a relatively flexible material so that as the lure is pulled through the water, the vibrational sounds are set up by the flexible elongated member.

The link which couples the elongated member to the connector eye on the head of the lure may preferably include a second connector eye on the other end thereof whereby the connector eyes are substantially on the same plane and define a shank therebetween. The elongated member is connected to one of the connector eyes and preferably the connector eye which is not connected to the head by placing the elongated member through the connector eye of the link and around the shank and back to the same connector eye and substantially centered forming the substantial V-shaped member.

Thus a feature of this invention is that the elongated member can be made of any particular length so that it will change the vibratory sounds as the lure is pulled through the water. This is simply done by extending the spinners or blades out further from the lure.

The line for the fishing line is then connected to the outward connector eye of the connector assembly so that it is held upwardly in the water, the weight distribution of the head of the lure and the hook cause the hook to be extended almost parallel to the plane of the surface of the water at all times and also it provides a swivel effect between the line and the lure so that it always extends in the desired direction.

DESCRIPTION OF THE DRAWINGS

These and other features and advantages will become more apparent to those skilled in the art when taken into consideration with the following detailed description wherein like reference numerals indicate like and corresponding parts throughout the several views and wherein.

DESCRIPTION OF THE PREFERRED EMBODIMENT

Figure 3:
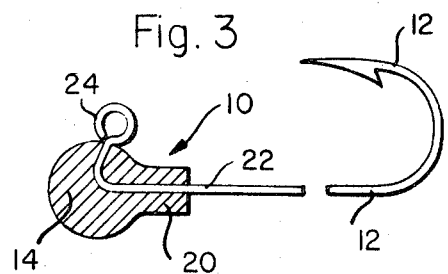
FIG. 3 is a section view taken along line 3—3 of FIG. 2.
Figure 1:
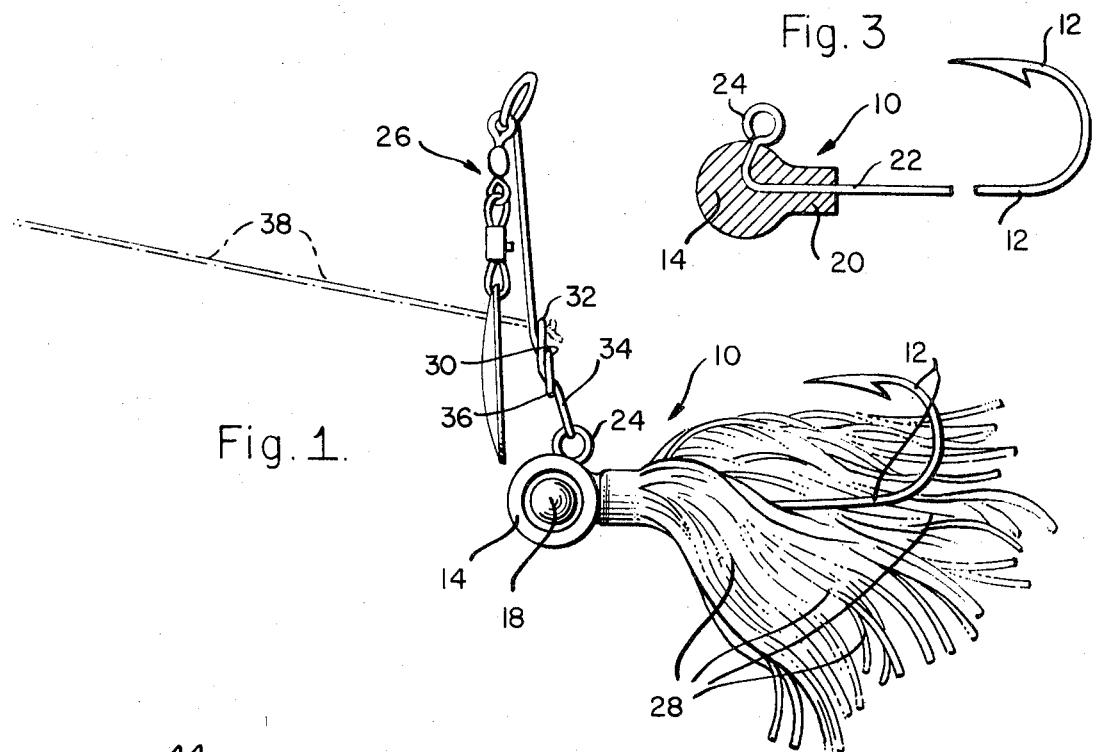
FIG. 1 is a side view of the fishing lure and connector assembly illustrating the principles of the present invention.

Turning now to the drawings, there is shown in FIG. 1 a fishing lure 10 which is comprised of a hook portion 12 and a head portion 14. The head portion 14 is generally weighted to cause the fishing lure 10 to sink to the bottom and the particular weight in this embodiment is especially useful for balancing purposes as will hereinafter be described. To facilitate the weighting requirements, fishing lures of this type are generally cast of lead. The head portion 14 may be somewhat cylindrical or barrel shaped and includes a pair of protruding portions 16 and 18 which may resemble eyes of a fish or other sea animal. The head portion 14 also includes a protruding collar 20 and hook shank portion 22 which is embedded into the collar 20 and into the head portion 14, as best shown in FIG. 3.

An eye 24 protrudes into the top of the head portion 14 and is used to connect the spinner assembly 26 thereto. The eye 24 is firmly embedded into the body of the head portion 14 and slightly rearward of the center line thereof towards the hook 12. Thus it provides a pendulum effect between the eye 24, the weight of the lead portion 14 and the hook 12 so that as the lure 10 is suspended by the eye 24, the hook 12 will extend horizontal to the earth's gravity.

A skirt 28 is connected to the collar portion 20 in a suitable manner and comprises a plurality of extending strands of material such as plastic or the like which is soft and flexible so that as the lure 10 is pulled submerged through the water, the skirt 28 fills out behind the hook substantially concealing the hook and creating a disturbance in the water.

A connector link 30 includes a pair of eyes 32 and 34 formed in the link 30 and substantially on the same plane defining a shank 36 therebetween. The link 30 is adapted to be attached to the lure by the eye 34 being connected to the connector eye 24 in the head portion 14. The fishing line 38, which may be coupled to a fishing pole, not shown, is connected to the eye 32 in a suitable manner.

The connector assembly 26 also includes a pair of extending arms 40 and 42 which are comprised, in the shown embodiment, of a single piece of wire and the preferred embodiment illustrated can preferably be of spring steel. To facilitate forming the pair of arms 40 and 42, the elongated spring steel is placed through the top of the eye 32 around the shank 36 and back out the eye 32 and thus is formed of a single construction. On either end of the arms 40 and 42 is a loop 44 and 46, respectively, which is formed in a suitable manner by bending the wire 42 back upon itself to form the loop 46 and bending the wire 40 back upon itself to form the loop 44. Coupled in a suitable manner to the loops 44 and 46 are a pair of blades or spinners 48 and 50 and can be coupled thereto in any suitable manner. In this embodiment they are shown coupled thereto by a pair of swivels 52 and 54, although it should be understood that any form of connecting would be suitable, but the swivels, of course, are necessary to insure that the spinners will spin as they are drawn through water.

Figure 2:
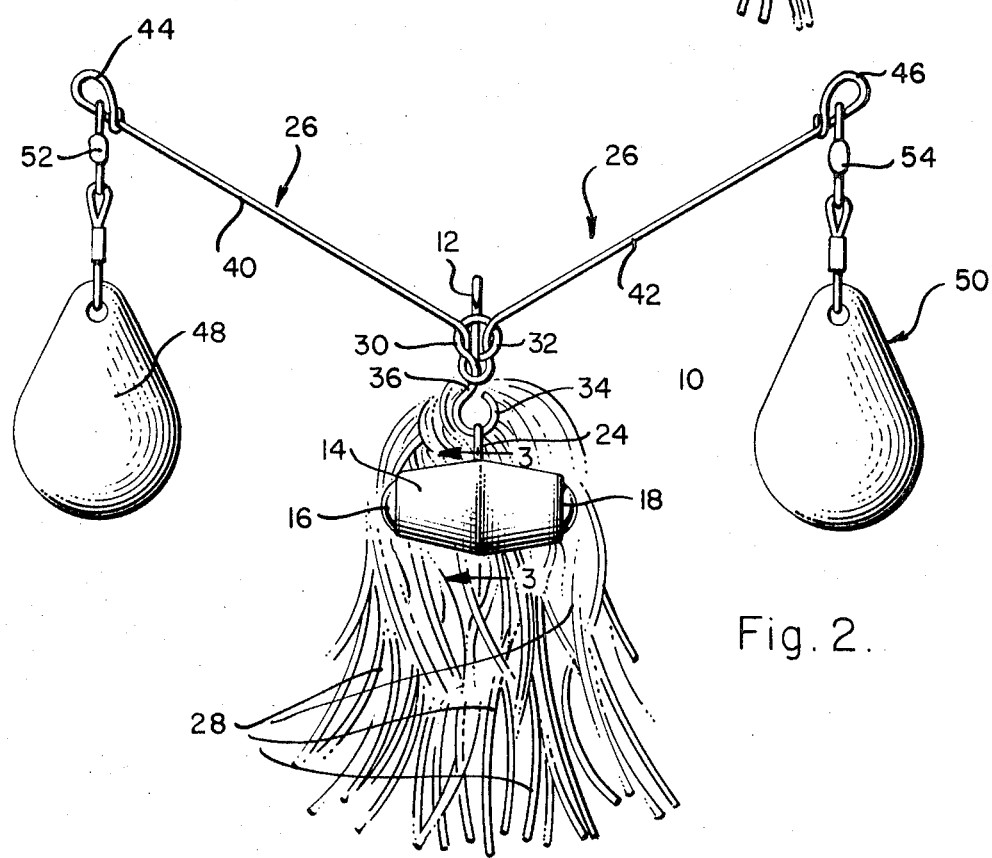
FIG. 2 is a frontal elevation view of the fishing lure and connector assembly in accordance with the principles of the present invention.

During use of the lure, the spinners will extend from the ends of arms 40 and 42 in a direction opposite to the direction of the pull on the lure and in FIG. 1, the spinners 48 and 50 will be located approximately opposite the hook portion 12. Because of the obtuse angle between arms 40 and 42, the spinners will be located laterally on opposite sides of the hook portion as shown in FIG. 2. Thus, when a fish strikes at either spinners or at skirt 28, it will be in close proximity to the hook portion 12.

Having thus described but one preferred embodiment, what is claimed is:

1. A fishing lure comprising a hook having a hook portion and a shank portion, a weighted head connected to said shank portion, a connector eye coupled to said weighted head in a position above said head and in approximate alignment with said hook, and a connector assembly coupled to said connector eye, said assembly comprising a shank having a first eye on one end thereof coupled to said connector eye, the plane of said first eye being transverse to the plane of said connector eye so as to permit said hook and head to swivel and pivot about said first eye in a plurality of planes;

said shank comprises a second eye on the opposite end from said first eye at which a pulling force is applied to said lure;

an elongated member comprising two arms arranged in a V-shape and rigidly connected to said second eye at the apex of the V, the plane of said arms extending from said shank in a plane approximately transverse to said hook, a spinner connected to the outer end of each arm by a swivel connection, said shank and arms being of a length and angularity for locating said spinners approximately transversely opposite said hook portion of said hook when the lure is moved during fishing, and a skirt connected to said head, said skirt comprising a plurality of strands of material extending beyond said hook portion to partially conceal said hook and create a disturbance in the water.

2. A fishing lure as defined in claim 1 wherein:

said connector eye is coupled to said weighted head at a position toward said hook so that a relatively equal weight distribution exists between said hook and said head and said hook assumes a substantially horizontal position when said lure is suspended by said connector eye.

3. The fishing lure as defined in claim 1 wherein: said arms are at an obtuse angle to one another.

* * * * *